April 27, 1965  R. F. MENARY  3,180,143
APPARATUS FOR AUTOMATICALLY DETECTING THICKNESS VARIATIONS
Filed Nov. 15, 1962  3 Sheets-Sheet 1
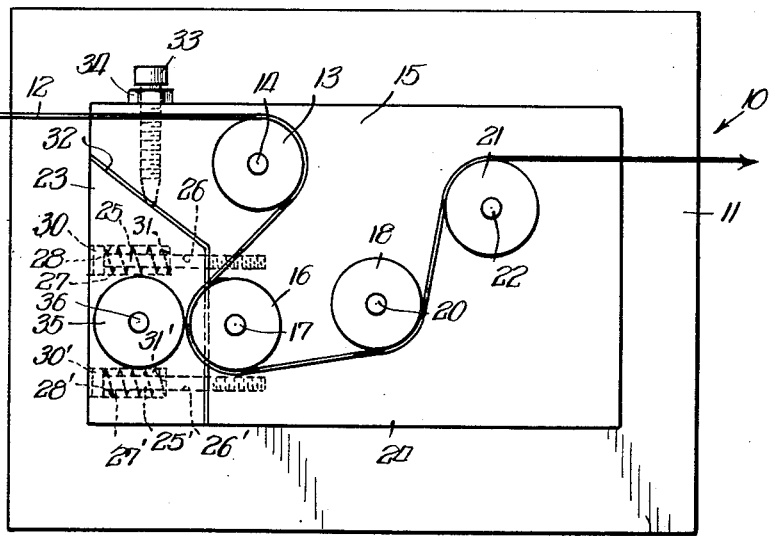
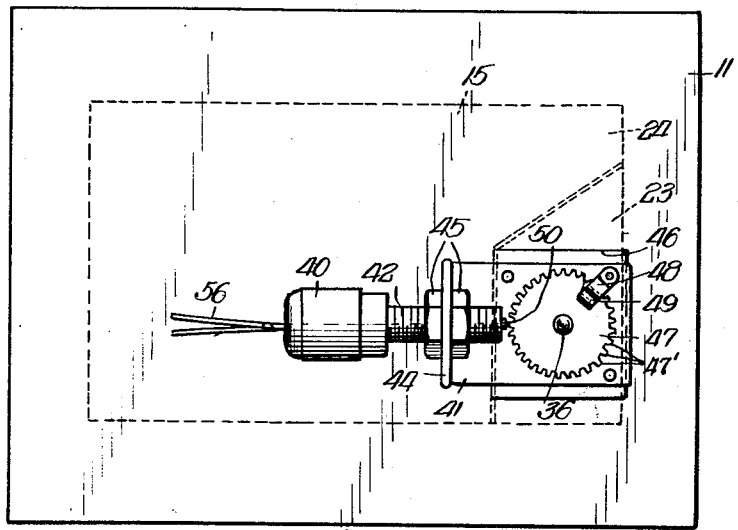
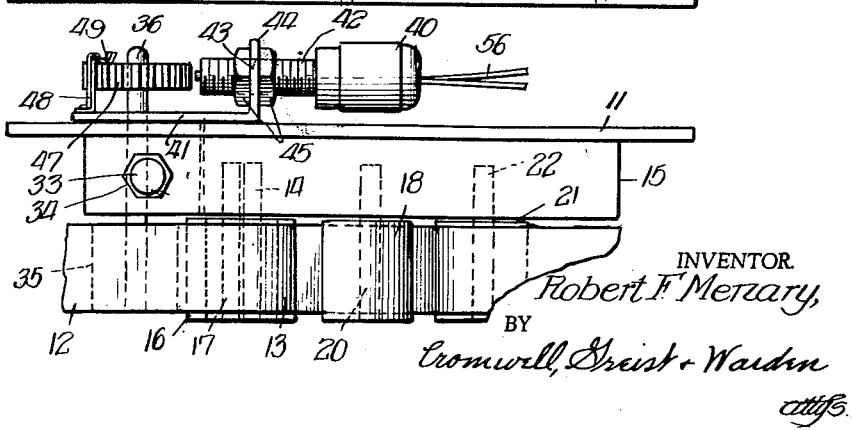
INVENTOR.
Robert F. Menary,
BY
Cromwell, Greist + Warden
attys.

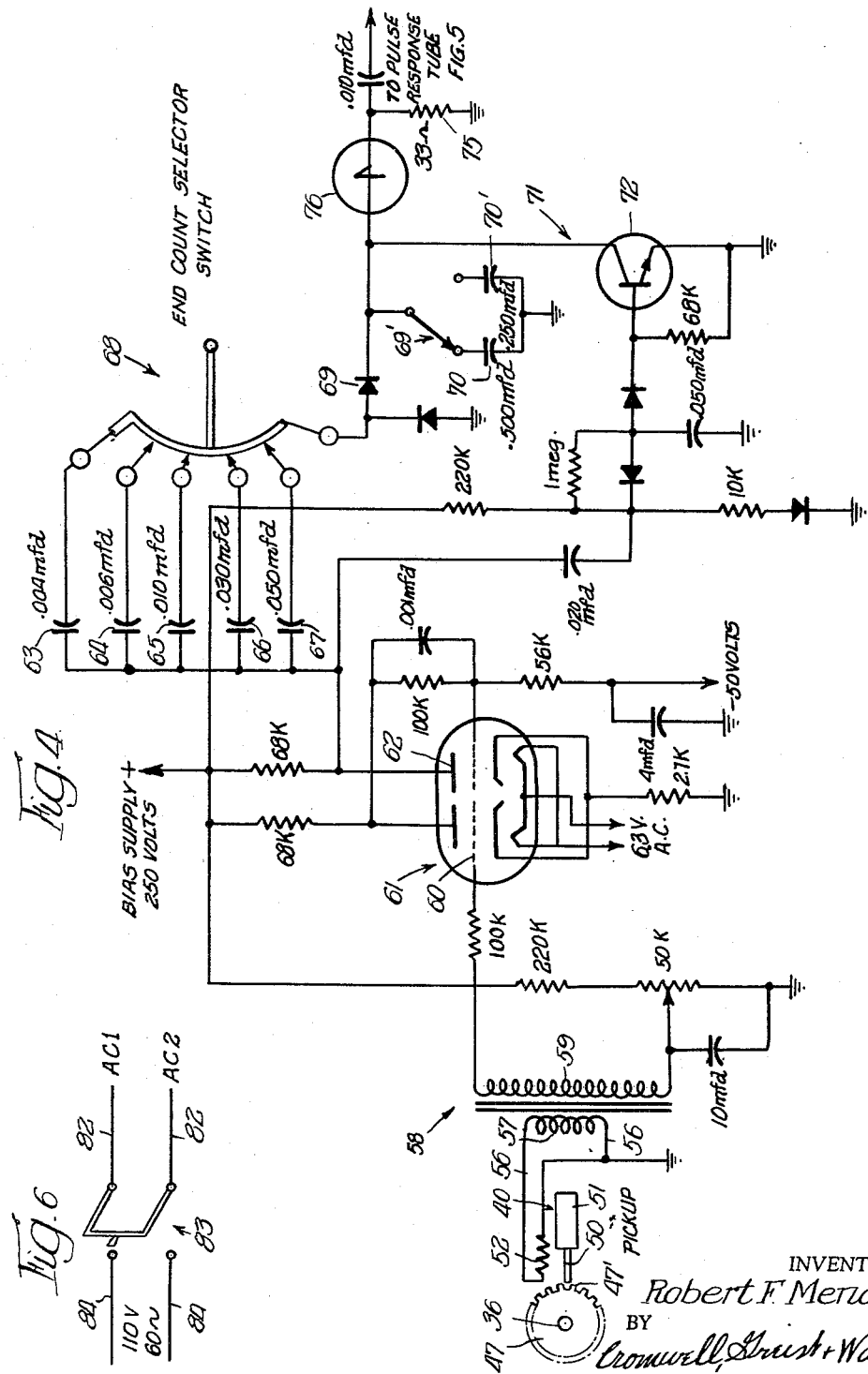

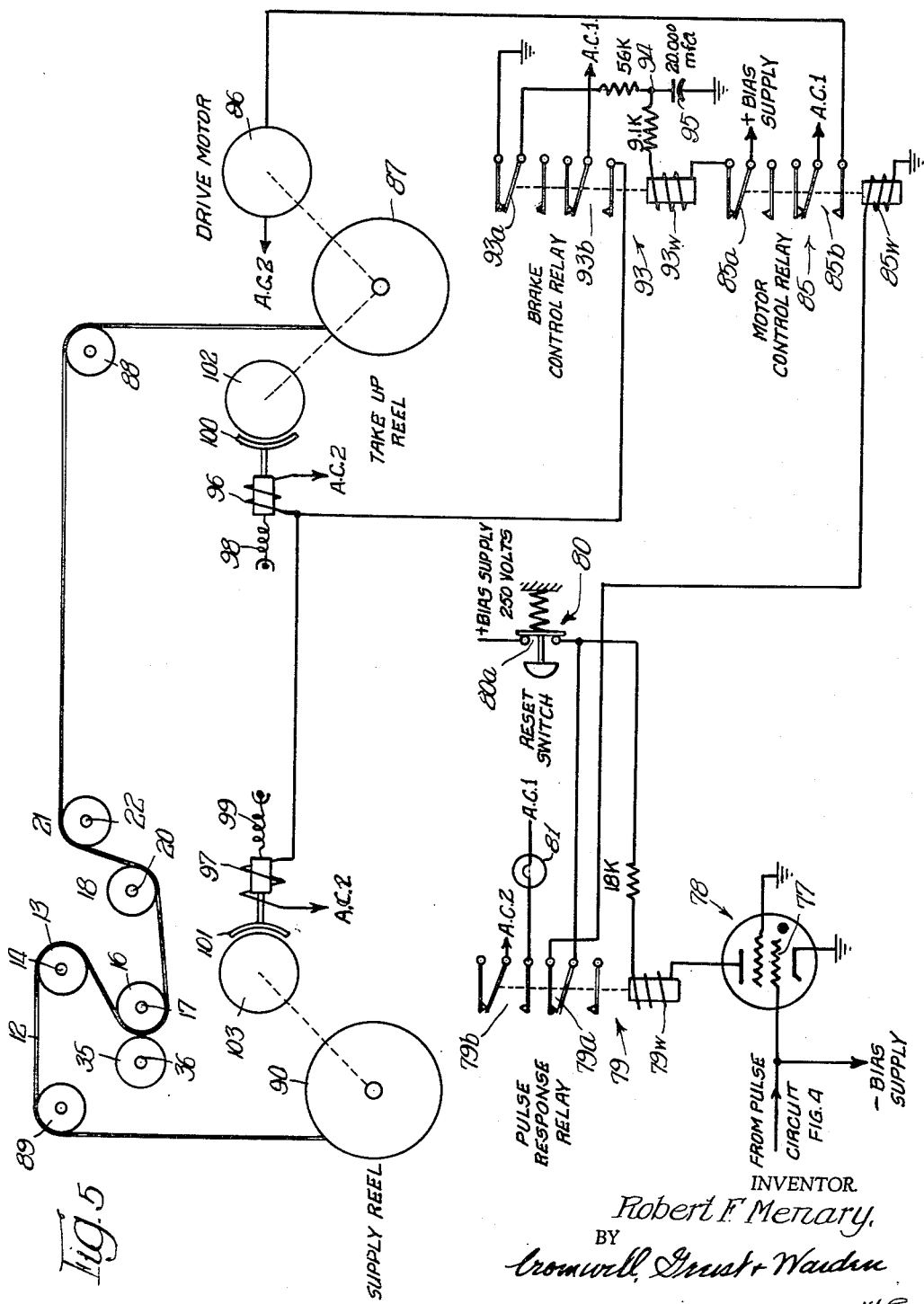

United States Patent Office 3,180,143
Patented Apr. 27, 1965

3,180,143
APPARATUS FOR AUTOMATICALLY DETECTING THICKNESS VARIATIONS
Robert F. Menary, 2400 Maple Ave., Northbrook, Ill.
Filed Nov. 15, 1962, Ser. No. 237,903
17 Claims. (Cl. 73—159)

This invention relates to apparatus for inspecting strip material, particularly, motion picture film and is more particularly concerned with improvements in apparatus for detecting variations in the thickness which are due to splices, warped or burned spots, sprocket punches, and the addition of foreign material to the film such as pieces of "Scotch" tape or like materials.

Motion picture film, because of its relatively fragile and easily damaged character, is customarily inspected after each use, particularly, in the case of commercial film when it is returned by the exhibitor, so that damage to the film, while in the hands of the exhibitor can be checked and appropriate repairs made before it is sent on to the next exhibitor. Otherwise, improper splices and other defects which are not removed can cause damage to the film as it runs through the film projecting machines. Film defects which can be most troublesome are those which result in an increase in film thickness, most often cause by the addition of "Scotch" tape or other foreign materials to the film, warped or burned spots and improperly made splices, that is, splices of excessive thickness. Inspection of the film to detect these and other objectionable defects can, of course, be accomplished manually by passing the film between the fingers of an inspector but this is not only a time consuming and laborious operation, but is often inaccurate and efforts have been made to develop machinery for automatically detecting film defects including thickness variations due to improper splicing and the like. Some machines for this purpose have been developed which automatically detect thickness variations and which can be adjusted to allow splices to pass which are of acceptable length and thickness while stopping the travel of the film for undesirable splices or other defects to enable the operator to remove the same, substituting a proper splice where necessary. Such machines comprise a film feeding apparatus which is responsive to a defect detector or "control" device through which the film runs and which is operated by film defects of a predetermined character to automatically stop the film feed in order for the operator to make the appropriate repairs. Such machines which have been heretofore provided have not been entirely satisfactory, principally because of the limited range of detection and adjustability, and it is a principal object, therefore, of the present invention to provide a machine for inspecting film or the like which has a broader range of detection than heretofore provided and which can be adjusted at the will of the operator to allow defects of a predetermined character to pass through and to detect other defects, which the operator considers undesirable, and stop the travel of the film or actuate a signal so that the operator can examine the defective film and make the necessary repairs.

It is a more specific object of the invention to provide in a machine for inspecting film materials apparatus for detecting variations in thickness which may be adjusted so as to differentiate between permissible thickness variations such as a splice of predetermined length and thickness and an unacceptable splice of excessive thickness or excessive length or the addition to the film of an undesirable length of "Scotch" tape or similar material or other defects resulting in a substantial increase in film thickness extending an appreciable distance along the film.

It is another object of the invention to provide in a film inspecting machine an apparatus which measures the length of film which has been increased in thickness above a predetermined amount by improper splicing, the presence of foreign material on the film surface such as a length of tape or other thickness increasing defects.

It is still another object of the invention to provide a film inspecting machine having incorporated therein apparatus for sensing areas of increased thickness in the film which machine comprises a support for the rapidly traveling film and a rotatably mounted roller which is spaced from the film support at least a distance corresponding to the normal thickness of the film, a device associated with the roller which is actuated by rotation of the roller to produce an electrical current varying with the amount of rotation of the roller, and an electrical circuit that is responsive to varying amounts of current and which actuates a signal or stops the machine in accordance with the amount of rotation of the roller.

It is a further object of the invention to provide a film inspecting machine which embodies a rotatably mounted roller which is spaced from a film support a distance sufficient to permit the passage of a traveling film of predetermined thickness and to be rotated by the passage of a film of greater thickness, an electromagnetic pick-up device mounted adjacent the roller so that current is induced therein by passage of teeth which are rotating with the roller, and an electric circuit which is actuated by the electromagnetic pick-up device for operating a signal or stopping the feed of the film.

Another object of the invention is to provide a detector mechanism for a defect sensing apparatus in a film inspecting machine which comprises a support for the film while it is advanced at a relatively high rate of speed, a rotatably mounted member spaced from the support a distance approximately the normal thickness of the film so that it is rotated by a film section having greater thickness than normal, the amount of rotation depending upon the degree of thickness and/or the length of thickened section, an electromagnetic pick-up device adjacent the rotatable member which is operated in response to rotation of actuating elements carried on the rotatable member, an electrical circuit connected to the electromagnetic pick-up device and operative in accordance with the current supplied by the electromagnetic pick-up device to actuate a signal or interrupt the drive for the film so as to stop the travel of the same.

It is a still further object of the invention to provide an apparatus for measuring areas of increased thickness in a traveling film strip, which result from the addition of foreign material on the film or from splicing, through the rotation of a roller that is placed across the width of the film and spaced slightly away from the film so that it is not contacted by film of normal thickness and remain at rest while film of normal thickness passes it, the roller being spaced from the film so that it is rotated slightly by passage of a splice of acceptable length and thickness but is rotated a greater amount by passage of film having excessive thickness or length, and an electric apparatus which measures the amount of rotation of the roller and provides an appropriate signal, stops the film or allows it to continue to run according to predetermined adjustment thereof.

Another object of the invention is to provide a detector for determining variations in film thickness which comprises a support for a traveling film strip, a roller mounted a sufficient distance from the support to allow a film of normal thickness to pass without rotating the same, the roller being rotated upon passage of a portion of the film having a greater thickness and the amount of rotation being determined by the excess in the thickness and/or the length of the thickened portion, an electromagnetic pick-up device mounted in relation to the roller so that it is operated by a toothed actuating member on the roller to develop an electrical current in accordance with the amount of rotation of the roller and an electrical circuit connected to the pick-up device which is operative in accordance with the amount of current developed by the pick-up device and which has an adjustable predetermined breakdown level, the circuit including a manually operated selector switch, and a control diode connected to a relay which is adapted when operated by the diode to stop the film feed or actuate a signal.

It is another object of the invention to provide in an apparatus of the type described an electrical circuit which includes a selector enabling the machine operator to pass or pick up longer or shorter film thickness variations at will.

It is another object of the invention to provide an apparatus of the type described which includes a circuit into which a current from the pick-up device is fed and a selector switch arrangement whereby any movement of the rotatably mounted roller due to passage of film having more than the normal thickness will operate the circuit to stop the travel of the film thereby permitting the operator to make a close inspection of the film and examine each splice if desired and then change the setting for the next film by merely adjusting the setting of the selector switch.

These and other objects and advantages of the invention will be apparent from a consideration of the apparatus which is shown by way of illustration in the accompanying drawings wherein:

FIGURE 1 is an elevation of a film thickness detector mechanism which is adapted to be incorporated in a film inspecting machine;

FIGURE 2 is an elevation of the opposite face of the detector apparatus of FIGURE 1;

FIGURE 3 is a plan view of the apparatus;

FIGURES 4 and 5, taken together with FIGURE 4 placed to the left of FIGURE 5, show an electrical diagram illustrating the electrical circuit employed with the detector mechanism; and FIGURE 6 shows the circuit connections for supplying alternating current for energizing the drive motor and the brakes shown in FIGURE 5.

The invention is illustrated as adapted for incorporation in a machine for inspecting motion picture film. However, only those elements of the machine are illustrated which are necessary to an understanding of the invention. The inspecting machine will have provisions for supporting the film reels and appropriate motor driven mechanism for advancing the film from a supply reel to take up reel, with the motor drive connected into a control circuit hereinafter referred to. The machine will also have provisions for detecting sprocket hole defects in the film and for counting the number of splices or other defects, if desired.

The film thickness detector 10 is mounted on a base plate 11 which is attached to the inspection machine by bolts, screws or other fasteners. In the arrangement shown in the film 12 advances over a guide roller 13 mounted for free rotation on a shaft 14 extending from a base plate 15 and located above a film support roller 16 which is mounted for free rotation on a supporting shaft 17 also extending from the base plate 15. The film 12 engages a substantial portion of the periphery of the support roller 16 and advances from the lower portion of its path about the roller 16 to the bottom of a second support roller 18 which is mounted for free rotation on the supporting shaft 20 extending from a base plate 15. The film 12 then passes upwardly to a freely rotatable guide roller 21 on the shaft 22 which extends from the support plate 15 so that the film 12 travels in a path around a bottom portion of the support roller 18 and a top portion of the guide roller 21 and leaves the detector head in a generally horizontal path.

The base plate 15, which is secured in fixed relation on the supporting plate 11, has a corner section 23 which is mounted in movable relation relative to the main section 24 of the plate on a pair of spaced guide bolts or rods 25, 25'. The guide bolts or rods 25, 25' are secured in the main section 24 of the base plate 15 and extend in parallel relation in parallel guide recesses or bores 26, 26' in the movable plate section or block 23. Relatively light compression springs 27, 27' are mounted on each of the guide rods 25, 25' in enlarged outer end portions 28, 28' of the guide bores 26, 26' so as to extend between the heads 30, 30' on the guide bolts 25, 25' and the shoulder formations 31, 31' at the inner ends of the bores 28, 28'. The springs 27, 27' normally urge the movable block member or base section 23 in the direction of the main section 24, of the base 15. The springs 27, 27' may be mounted independently of the guide bolts 25, 25' in any desired manner so as to resiliently urge the block member 23 toward the main section 24 of the base 15. The uppermost edge or face 32 of the movable base member 23 is tapered upwardly and outwardly as shown in FIGURE 1 and an adjusting screw 33 is provided in the main section 24 of the base plate 15 with its inner end normally bearing on the face 32 of the movable base member 23 so as to enable the base member 23 to be adjusted relative to the main section 24 of the base plate 15. A lock nut 34 on the adjusting screw 33 enables the screw 33 to be locked in adjusted position.

The movable base member 23 carries a roller 35 mounted on a laterally extending shaft 36 which is journaled in the base member 23 with the periphery of the roller 35 in oppositely disposed relation to the film supporting or film carrying peripheral portion of the film support roller 16. The base member 23 is normally positioned so that the roller 35 is spaced from the roller 16 a distance which is only slightly greater than the normal thickness of the film 12 so as to permit free passage of a film of normal thickness without any movement of the roller 35. The resilient mounting of the movable base member 23 permits lateral movement of the roller 35 relative to the roller 16 so as to permit passage of a thick section of film without any damage to the film or the roller mounting.

A magnetic pick-up device 40 (FIGURES 2 and 3) is supported on the back side of the mounting plate 11 by means of the angle bracket 41. The pick-up device 40 has a threaded stem portion 42 which extends through an aperture 43 in the outwardly directed arm 44 of the angle bracket 41 and is held in adjusted relation thereon by the lock nuts 45. The supporting bracket 41 for the electromagnetic pick-up device 40 is mounted on the back face of the movable base member 23 the latter being accessible through an opening 46 in the mounting plate 11. The shaft 36 on which the roller 35 is mounted has a rear end extension on which a magnetic actuator in the form of a gear member 47 is mounted for cooperation with the pick-up device 40. The teeth 47' of the gear member 27, at least, are of magnetic material for a purpose that will be apparent presently. A friction spring 48 is secured on the bracket 41 with its free end 49 bearing on the side face of the gear member 47 to prevent it from free wheeling due to momentum or imbalance of the gear member 47. The pick-up device 40 is adjustably positioned relative to the actuating gear member or wheel 47 to locate the pole piece 50 of its magnetic core 51 at the proper distance from the outer ends of the teeth 47' of the gear member 47 to induce a current in a winding 52 of the device 40 when the gear member 47 rotates. It will be understood that an alternating voltage is generated by the current that is induced in the winding 42 whose wave form is determined by the number and shape of the teeth 47' of the magnetic material on the gear member 47 and whose frequency is determined by the speed of movement of the teeth 47' past the pole piece 50. The number of cycles or pulses of current flow in the winding 52 is a function of the number of teeth 47' that pass the pole piece 50. Since this number depends upon the extent of rotation of the roller 35 when it is contacted by an abnormal thickness of the film 12, it is possible by totalizing the number of pulses to provide an accurate measure of the length of the abnormality along the film 12, i.e., the length of a splice in which a double thickness of the film 12 occurs. It remains to describe how the pulses are counted and certain of the uses to which the pulse counting system can be put in connection with inspection of the film 12.

FIGURES 4, 5 and 6 show the circuit connections that can be employed in making use of the alternating current generated in the winding 52 of the magnetic pick-up device 40 for controlling the operation of the mechanism which moves the film 12 past the film thickness detector 10.

Referring now particularly to FIGURE 4, it will be observed that the winding 52 is connected by conductors 56, 56 to a primary winding 57 of a grid transformer that is indicated, generally, at 58. A secondary winding 59 is a part of the grid transformer 58 and it is arranged to control the energization of a grid 60 that forms a part of a two stage amplifier in the form of a Schmitt trigger stage (RCA 5965). A voltage of the order of 250 volts is employed in conjunction with the control system herein disclosed. The arrangement is such that on the triggering of the amplifier 61 a 160 volt square wave is generated between the anode or plate 62 and ground. This voltage is applied to commonly connected terminals of capaictors 63, 64, 65, 66 and 67, each having, as indicated, a different capacitance and all of them being arranged to be controlled by a selector switch, shown generally at 68, for connection through a dry type rectifier 69 to a capacitor 70, the capacitance of which is substantially greater than that of any of the capacitors 63 to 67 inclusive. One or more additional capacitors 70′ having different capacitance may be provided which may be employed selectively through a manually operated switch 69′ to provide for further control of the current.

When a splice occurs in the film 12 so as to provide an abnormal thickness, the roller 35 is rotated through an extent, depending upon the length of the abnormailty, or, if a splice, the length of the splice. In turn the gear member 47 is similarly rotated and the gear teeth 47′ are moved past the pole piece 50. The resulting cycles of alternating current induced in the winding 52 are applied to the primary winding 57 and transformed by the transformer 58 to operate the amplifier 61 and cause the plate 62 to generate the square wave for charging one of the capacitors, for example, the capacitor 63, in series with the capacitor 70 for as long as the impulses continue to be received in the winding 52 of the magnetic pick-up device 40. The capacitor 70 continues to be charged until a predetermined voltage, i.e., a voltage of 30 volts thereacross obtains. Where it is desired that a relatively short abnormality is to be detected, then the minimum capacitance as indicated for the capacitor 63 is connected in circuit. Where a longer abnormality or a longer splice is to be detected the series connected capacitance is increased by shifting the selector 68 to the appropriate position. Further adjustment may be had by switching to a capacitor 70′ having a different capacitance.

As soon as the abnormality has passed the roller 35, it ceases to rotate and likewise rotation of the gear member 47 is arrested. At this time the charge on the capacitor 70 should be reduced to zero. This may occur either after the capacitor 70 has been partially charged or has been fully charged. It is desirable to completely discharge it in order that it can begin to measure accurately the next abnormality that occurs along the film 12. In order to discharge the capacitor 70 a discharge circuit, shown generally at 71, is employed. It includes an NPN transistor 72 which is connected to ground and which functions to discharge the capacitor 70 at the end of any timing cycle.

Provision is made for employing the charge on the capacitor 70 for energizing a load circuit that may comprise a resistor 75. However, it is desired that the load circuit 75 not be energized until a predetermined charge exists on the capacitor 70 which corresponds to a length of abnormality of the film 12 which it is desired to detect. For this purpose a Shockley diode, indicated generally at 76, is employed. The diode 76 is so arranged and constructed that, while the capacitor 70 is being charged up to the predetermined voltage, i.e., a voltage of 30 volts, the current flow therethrough is negligible. However, when the predetermined voltage is reached, which corresponds to a predetermined length of the abnormality in the film 12 depending upon the particular capacitor 63 to 67 that is connected in series circuit relation therewith, the diode 76 breaks down, becomes conducting and permits the charge on the capacitor 70 to energize the load circuit 75. As a result a voltage drop occurs across it which is employed to perform indicating and control functions which will now be described.

Referring particularly to FIGURE 5 of the drawings, it will be noted that the voltage drop across the load circuit 75 is applied to a control grid 77 of an electric valve that is indicated, generally, at 78. It may be of the thyratron type, the characteristic of which is that, once it is rendered conducting, it remains conducting until the circuit therethrough is interrupted.

The electric valve 78 is arranged to control the energization of a pulse response relay that is indicated, generally, at 79. It has an operating winding 79w, one terminal of which is connected to the plate of the electric valve 78 while the other terminal is connected through normally closed contacts 80a of a reset switch that is indicated, generally, at 80 to the positive side of a bias supply which may be the 250 volt source previously referred to. The pulse response relay 79 also includes normally closed contacts 79a and normally open contacts 79b. On energization of the operating winding 79w the normally open contacts 79b are closed to complete a circuit for energizing an indicator, such as an indicating lamp 81. It will be observed that it is energized from a conductor indicated as AC1 and through the contacts 79b when closed to a conductor AC2. Referring to FIGURE 6, it will be observed that the conductors AC1 and AC2, which are referred to at other locations in FIGURE 5, comprise conductors 82, 82 which are connected through a switch 83 for energization to conductors 84, 84 that are connected to a suitable alternating current source such as 110 volt 60 cycle source. Thus, one result of rendering the electric valve 78 conducting is to operate the pulse response relay 79 and close contact 79b for energizing the indicating lamp 81. This shows that an abnormality has been detected.

Another result of the energization of the operating winding 79w of the pulse response relay 79 is to open contacts 79a and open the energizing circuit for the operating winding 85w of a motor control relay that is indicated, generally, at 85. It will be noted that this energizing circuit extends through the normally closed contacts 80a of the reset switch 80 and that, as long as it remains closed and as long as the pulse response relay 79 is deenergized, the operating winding 85w of the motor control relay 85 is energized. The motor control relay 85 includes normally closed contacts 85a and normally open contacts 85b.

When the motor control relay 85 is energized, as described, a circuit is completed from AC1 through contacts 85b to energize a drive motor 86 which is connected to the other terminal AC2 of the alternating current energizing circuit. As indicated here diagrammatically, the drive motor 86 is arranged to drive a take up reel 87 on which the film 12 is wound. It is directed to the take up reel 87 over a guide roller 88 from the film thickness detector 10 and is directed to it over a guide roller 89 from a supply reel 90 from which the film 12 is being transferred to the take up reel 87 and during which transfer it is being inspected to detect, among other things, abnormalities in the thickness thereof.

It will be understood that, upon deenergization of the motor control relay 85 in the manner described, the drive motor 86 no longer is energized and it stops. However, it is desirable that further rotation of the take up reel 87 and supply reel 90 be prevented at the same time. For this purpose a braking system is employed and is controlled by the normally closed contacts 85a.

The normally closed contacts 85a, when they are closed as the result of the deenergization of the motor control relay 85, complete an energizing circuit for the operating winding 93w of a brake control relay that is indicated, generally, at 93. The operating winding 93w is energized through a pair of resistors which have a common connection at 94 and through normally closed contacts 93a to ground. The intermediate terminal 94 is connected through a capacitor 95 which, as indicated, has a relatively high capacitance, to ground. This arrangement is provided for maintaining energized the operating winding 93w after its initial energizing circuit is opened by opening of the normally closed contacts 93a. For a brief time the operating winding 93w continues to be energized as a result of charging of the capacitor 95 through the normally closed contacts 85a of the motor control relay 85 when it was deenergized.

The brake control relay 93 also includes normally open contacts 93b which are closed for a brief interval that depends upon the time for charging the capacitor 95. During this interval an energizing circuit from terminal AC1 is completed for energizing windings 96 and 97 which are connected to terminal AC2. The brake energizing windings 96 and 97 are arranged to overcome the force exerted by brake retracting springs 98 and 99 and move brake shoes 100 and 101 into braking contact engagement with brake drums 102 and 103 that are mechanically connected to the take up reel 87 and the supply reel 90, respectively. The brake control relay 93 is maintained in the energized condition long enough to energize the windings 96 and 97 for a time sufficient to bring the take up reel 87 and the supply reel 90 to a complete stop. This will be at a time where the abnormality in the film 12 is in a position where it can be readily inspected by the operator.

When the operator desires to restart the equipment, he depresses the reset switch 80. This opens the energizing circuit to the operating winding 79w of the pulse response relay 79. It is deenergized and the electric valve 78 no longer is maintained in the conducting state. Contacts 79b are opened and the indicating lamp 81 is extinguished. Contacts 79a are closed and the energizing circuit for operating winding 85w of the motor control relay 85 is energized. The energizing circuit then is completed at contacts 85b for the drive motor 86. Contacts 85a are opened. However, the operating winding 93w of the brake control relay 93 has been previously deenergized since the capacitor 95 has been previously completely charged and charging current no longer flows through the operating winding 93w. The opening of contacts 85a insures that the brake control relay 93 will not be energized as long as the drive motor 86 continues to be energized.

In FIGURES 4 and 5 of the drawings, certain values of resistance and capacitance have been indicated. It will be understood that they are for illustrative purposes and that other values can be used.

I claim:

1. In an apparatus for inspecting motion picture film, a supporting roller for a traveling film, a detector roller mounted for free rotation on an axis which is parallel with the axis of the film supporting roller, said detector roller being spaced from said film supporting roller a distance slightly greater than the normal thickness of the film being inspected whereby said detector roller will be rotated by the passage of film of greater than normal thickness, a magnetic pick-up device mounted adjacent said detector roller, an actuator for said magnetic pick-up device which is coupled to the detector roller and which rotates with the roller, said actuator causing the pick-up device to produce a current for a time in accordance with the amount of rotation of the detector roller, an indicating means and an electrical circuit connected to the pick-up device and to said indicating means which is operated in response to a predetermined current for a predetermined time produced by the pick-up device to operate the indicating means.

2. In a film inspecting apparatus, a support for a traveling film, a detector roller mounted for free rotation on an axis parallel with the plane of travel of the film, said detector roller being spaced from said film support a distance slightly greater than the normal thickness of the film being inspected whereby film of normal thickness will pass freely between the support and the detector roller and film of greater than normal thickness will rotate the detector roller, a magnetic pick-up device mounted adjacent said detector roller, an actuator for said magnetic pick-up device which rotates with the detector roller and which causes the pick-up device to produce a current for a time in accordance with the amount of rotation of the detector roller, an indicating means and an electrical circuit connected to the pick-up device and to the indicating means which is operated in response to a predetermined current for a predetermined time produced by the pick-up device.

3. In a film inspecting apparatus as recited in claim 2, and said circuit having a selector device which is operable to vary the response time for said indicating means.

4. An apparatus for inspecting a traveling strip of film material comprising a support roller for the film, a detector roller mounted for free rotation on an axis which is in a plane parallel with the plane of the film and extending transversely thereof, said detector roller having its surface normally spaced from said film support roller a distance corresponding approximately to the normal thickness of the film whereby film of normal thickness will pass freely between said rollers while film of greater than normal thickness will rotate said detector roller, a magnetic pick-up device mounted adjacent said detector roller, an actuator for said magnetic pick-up device which rotates with the detector roller and which causes the pick-up device to produce a current for a time in accordance with the amount of rotation of the detector roller, an indicating means and an electrical circuit connected to the pick-up device and to said indicating means which circuit has means for operating said indicating means in response to a predetermined current for a predetermined time produced by the pick-up device.

5. In a film inspecting apparatus, a support for a traveling film, a detector roller mounted for free rotation on an axis parallel with the plane of travel of the film, said detector roller being spaced from said film support a distance slightly greater than the normal thickness of the film being inspected whereby film of normal thickness will pass freely therebetween while the film of greater than normal thickness will rotate said detector roller, a magnetic actuator driven by said roller through an extent depending upon the length of the greater than normal thickness of the film, a magnetic pick-up device adjacent said magnetic actuator including a winding in which alternating current is induced with the number of cycles thereof being a function of the length of the greater than normal thickness of the film, and means for totalizing the number of cycles of alternating current whereby a measure of the length of the greater than normal thickness of the film is provided.

6. In apparatus for inspecting a traveling film having a normal thickness and likely to have one or more lengths of abnormal thickness, a magnetic actuator arranged and adapted to be moved in response to the occurrence of an abnormal thickness of the film through an extent depending upon the length thereof, a magnetic pick-up device adjacent said magnetic actuator including a winding in which alternating current is induced with the number of cycles thereof being a function of the length of the abnormal thickness, and means for totalizing the number of cycles of alternating current whereby a measure of the length of the abnormal thickness is provided.

7. In apparatus for inspecting a traveling film as recited in claim 6, wherein means responsive only to a minimum number of cycles of the alternating current detect the length of the abnormal thickness of the film whereby abnormalities of less than a predetermined length are not detected.

8. In apparatus for inspecting a traveling film as recited in claim 7, wherein means operatively associated with the cycle responsive means vary the minimum number of cycles of alternating current required to effect the detection of a length of abnormal thickness of the film.

9. In apparatus for inspecting a traveling film having a normal thickness and likely to have one or more lengths of abnormal thickness, a magnetic actuator arranged and adapted to be moved in response to the occurrence of an abnormal thickness of the film through an extent depending upon the length thereof, a magnetic pick-up device adjacent said magnetic actuator including a winding in which alternating current is induced with the number of cycles thereof being a function of the length of the abnormal thickness, a capacitor, and means interconnecting said winding and said capacitor whereby the latter is charged to a voltage corresponding to the number of cycles of alternating current and thereby the length of the abnormal thickness.

10. In apparatus for inspecting a traveling film having a normal thickness and likely to have one or more lengths of abnormal thickness, a magnetic actuator arranged and adapted to be moved in response to the occurrence of an abnormal thickness of the film through an extent depending upon the length thereof, a magnetic pick-up device adjacent said magnetic actuator including a winding in which alternating current is induced with the number of cycles thereof being a function of the length of the abnormal thickness, a capacitor, means interconnecting said winding and said capacitor whereby the latter is charged to a voltage corresponding to the number of cycles of alternating current and thereby the length of the abnormal thickness, and variable capacitance means connected in series circuit relation with said capacitor for varying the number of cycles of the alternating current required to charge said capaictor to said voltage.

11. In an apparatus for inspecting a traveling film having a normal thickness and likely to have one or more lengths of abnormal thickness, a magnetic actuator arranged and adapted to be moved in response to the occurrence of an abnormal thickness of the film through an extent depending upon the length thereof, a magnetic pick-up device adjacent said magnetic actuator including a winding in which alternating current is induced with the number of cycles thereof being a function of the length of the abnormal thickness, a capacitor, means interconnecting said winding and said capacitor whereby the latter is charged to a voltage corresponding to the number of cycles of alternating current and thereby the length of the abnormal thickness, and means for discharging said capacitor at the termination of each charging period.

12. In apparatus for inspecting a traveling film having a normal thickness and likely to have one or more lengths of abnormal thickness, a magnetic actuator arranged and adapted to be moved in response to the occurrence of an abnormal thickness of the film through an extent depending upon the length thereof, a magnetic pick-up device adjacent said magnetic actuator including a winding in which alternating current is induced with the number of cycles thereof being a function of the length of the abnormal thickness, a capacitor, means interconnecting said winding and said capacitor whereby the latter is charged to a voltage corresponding to the number of cycles of alternating current and thereby the length of the abnormal thickness, a load circuit connected for energization to said capacitor, a diode interposed between said load circuit and said capacitor characterized by becoming conducting upon said capacitor being charged to said voltage and thereupon permitting energization of said load circuit by the charge on said capacitor, and means responsive to the energization of said load circuit.

13. In apparatus for inspecting a traveling film as recited in claim 12, wherein the means responsive to the energization of the load circuit is an electric valve that is rendered conducting thereupon.

14. In apparatus for inspecting a traveling film as recited in claim 13, wherein a motor causes the film to travel past the magnetic actuator, and relay means responsive to the electric valve being rendered conducting stop said motor.

15. In apparatus for inspecting a traveling film as recited in claim 14, wherein brake means operated by the relay means stop the film.

16. In apparatus for inspecting a traveling film having a predetermined normal thickness and likely to have one or more sections of abnormal thickness, a magnetic actuator arranged and adapted to be rotated in response to the occurrence of a section of said film having an abnormal thickness through an extent depending upon the length and/or thickness of said section of film of abnormal thickness, a magnetic pick-up device adjacent said magnetic actuator including a winding in which alternating current is induced with the number of cycles thereof being a function of the extent of rotation of said actuator, and means for totalizing the number of cycles of alternating current whereby a measure of the length or thickness of the section of film of abnormal thickness is provided.

17. In a film inspecting apparatus, a support for a traveling film, a detector roller, means adjustably mounting the detector roller for free rotation adjacent said support with the peripheral surface of said detector roller spaced from said support a distance sufficient for film of predetermined thickness to pass freely between said roller surface and said film support while film of greater than said predetermined thickness will rotate said detector roller, the amount of rotation of said detector roller depending upon the length of the film having greater than said predetermined thickness and/or on the thickness of said film in excess of said predetermined thickness, a magnetic actuator driven by said detector roller through an extent depending upon the rotation of said detector roller, a magnetic pick-up device adjacent said magnetic actuator including a winding in which alternating current is induced with the number of cycles thereof being a function of the amount of rotation of said detector roller, and means for totalizing the number of cycles of alternating current whereby a measure is provided of the length of said film having greater than said predetermined thickness and/or the excess in the thickness thereof.

References Cited by the Examiner
UNITED STATES PATENTS

| 1,218,988 | 3/17 | Droitcour. | |
| 2,387,952 | 10/45 | Smith | 73—159 X |
| 2,392,010 | 1/46 | Stevens. | |
| 2,454,367 | 11/48 | Artzt | 84—1.01 X |
| 2,909,828 | 10/59 | Crandall | 28—64 |

RICHARD C. QUEISSER, *Primary Examiner.*

JOSEPH P. STRIZAK, *Examiner.*